United States Patent [19]

Sellstrom et al.

[11] Patent Number: 4,574,143

[45] Date of Patent: Mar. 4, 1986

[54] AMINE CURING AGENTS AND EPOXY RESINS CURED THEREWITH

[75] Inventors: Kathy B. Sellstrom; Harold G. Waddill, both of Austin, Tex.

[73] Assignee: Texaco, Inc., White Plains, N.Y.

[21] Appl. No.: 670,171

[22] Filed: Nov. 9, 1984

Related U.S. Application Data

[63] Continuation-in-part of Ser. No. 510,696, Jul. 5, 1983, abandoned.

[51] Int. Cl.[4] .............................................. C08L 67/00
[52] U.S. Cl. ..................................... 525/438; 521/48; 525/423; 525/437; 528/492
[58] Field of Search ....................... 525/438, 437, 423; 524/605; 521/48; 528/492

[56] References Cited

U.S. PATENT DOCUMENTS 2,944,996  7/1960  Berenbaum ........................ 525/438
4,139,524  2/1979  Waddill ............................. 528/109
4,162,358  7/1979  Marquis et al. ..................... 528/120

FOREIGN PATENT DOCUMENTS 186542  7/1968  U.S.S.R. .

OTHER PUBLICATIONS

"Handbook of Epoxy Resins", H. Lee & K. Neville, McGraw-Hill Book Co., 1967.
"Jeffamines[R] Polyoxypropyleneamines", 1978, Jefferson Chemical Company.
Plastics Technology, Sep. 1961.
C&E News, Jan. 5, 1981.

Primary Examiner—Theodore E. Pertilla
Attorney, Agent, or Firm—Jack H. Park; Kenneth R. Priem

[57] ABSTRACT

In accordance with the present invention an epoxy resin is cured with new curing agents prepared by extending an amine-type curing agent with polyethylene terephthalate.

37 Claims, No Drawings

AMINE CURING AGENTS AND EPOXY RESINS CURED THEREWITH

BACKGROUND OF THE INVENTION

1. Related Patent Application

This application is a continuation-in-part of U.S. patent application Ser. No. 06/510,696 filed July 5, 1983, now abandoned, for Kathy Beth Sellstrom and Harold George Waddill and entitled "Novel Amine Curing Agents and Epoxy Resins Cured Therewith".

2. Technical Field of the Invention

This invention relates to curing agents for epoxy resins and more particularly to amines of the type heretofore known for use as curing agents for epoxy resins modified by the incorporation into such amines of a solid polyethylene terephthalate. The resulting composition is used to cure epoxy resins of the type heretofore known in the art.

3. Prior Art

It is known to use amines such as aliphatic or aromatic amines for the curing of epoxy resins as shown, for example in Waddill U.S. Pat. No. 4,139,524 and Marquis et al. U.S. Pat. No. 4,162,358. See also, the textbook "Handbook of Epoxy Resins" by H. Lee and K. Neville, McGraw Hill Book Co., 1967. There is significant technical literature on this subject as illustrated, for example by a technical brochure entitled "Jeffamine ® Polyoxypropyleneamines", Copyright 1978 by Jefferson Chemical Company, Inc.

An extensive body of technical knowledge has arisen relating to the preparation of solid polyethylene terephthalate from suitable monomers such as ethylene glycol and dimethylterephthalate. Typical polymers are known to have outstanding toughness and dielectric properties. These materials are useful in forming sheet, film and fibers as well as injection moldings and extrusions.

Polyethylene terephthalate is widely used in the manufacture of beverage bottles and the disposal of used bottles in an environmentally acceptable manner presents a major problem. One proposed solution has been to convert the used polymer into an unsaturated polyester that can be used to make moldings such as boat hulls (Plastics Technology, September 1981). The used bottles are reported to have been used as raw materials in the manufacture of industrial strappings, fiber fill for pillows, sleeping bags and the like, synthetic lumber and corrugated rubber (C&E News, Jan. 5, 1981, p. 30).

Berenbaum U.S. Pat. No. 2,944,966 is directed to the use of polyesters to modify epoxy resins. The modifying polyesters of Berenbaum are copolyesters having predominantly terminal hydroxyl groups prepared by the reaction of diethylene glycol and propylene glycol with phthalic acid or anhydride and adipic acid, one or both of the glycols being used in molar excess. The copolyesters are mixed with a polyepoxide resin, a catalyst is added and the mixture is cast or molded while still hot. The catalyst that is used is preferably an amine such as diethylene triamine.

Erlikh USSR Pat. No. 186,542 discloses a modification of Authors Certificate No. 186,541 and discloses a composition containing an epoxy resin, liquid thiokol, a polyethylenepolyamine and a polyester. The polyester may comprise up to 50% by weight of the composition, the polyethylenepolyamine may comprise about 20% by weight of the composition and the epoxy resin will have a content of not less than 18% epoxy groups. It is stated that the introduction of the polyester permits reducing the second-order transition temperature (glass point) and an increase in the mechanical resistance of the compound.

SUMMARY OF THE INVENTION

In one aspect the present invention is directed to modified (i.e., extended) amine curing agents which are prepared by dissolving a polyethylene terephthalate resin in an amine of the type used for curing epoxy resins. The polyethylene terephthalate can be incorporated into the amine by comminuting the polyethylene terephthalate and adding this to the amine at an elevated temperature such as a temperature within the range of about 100° to about 250° C.

Under these conditions the polyethylene terephthalate is at least partially degraded so that the resultant solution can also be considered to be a solution of an at least partially degraded normally solid polyethylene terephthalate in an amine curing agent.

In another aspect the present invention is directed to the use of extended amine curing agents for curing epoxy resins.

DETAILED DESCRIPTION

The principal components of the compositions and methods of the present invention are the epoxy resin, the amine curing agent and the polyethylene terephthalate used to extend the amine.

EPOXIDE STARTING MATERIALS

Generally the vicinal epoxide compositions that can be cured using the curing agents of this invention are organic materials having an average of more than one reactive 1,2-epoxide group. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, halogenated phenyl groups and the like.

The most widely used epoxy resins are diglycidyl ethers of bisphenol A:

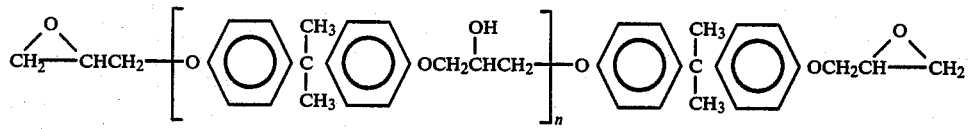

where n equals an integer of up to about 10 to 20.

However, these epoxides are representative of the broader class of epoxide compounds that are useful in making epoxy resins.

A widely used class of polyepoxides that can be cured according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylmethane, 4,4'-dihydroxydiphenylbutylphenylmethane, 2,2'-dihydroxydiphenylditolylmethane, 4,4'-dihydroxydiphenyltolylmethyl-methane and the like. Other polyhydric phenols which may also be co-reacted with an epihalohydrin to provide these epoxy polyethers are such compounds as resorcinol, hydroquinone, substituted hydroquinones, e.g., tert-butylhydroquinone, and the like.

Among the polyhydric alcohols that can be co-reacted with an epihalohydrin to provide the resinous epoxy polyethers are such compounds as ethylene glycol, propylene glycol, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as α-monothioglycerol, α,α'-dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides that can be cured by means of the above-described curing agents includes the epoxy novolac resins obtained by reacting, preferably, in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K. "Handbook of Epoxy Resins".

It will be appreciated by those skilled in the art that the polyepoxide compositions that can be cured according to the practice of the present invention are not limited to the above described polyepoxides, but that these polyepoxides are to be considered merely as being representative of the class of polyepoxides as a whole.

The amount of curing agent that is employed in curing polyepoxide compositions will depend on the amine equivalent weight of the curing agent employed. The total number of equivalents of amine group is preferably from about 0.8 to about 1.2 times the number of epoxide equivalents present in the curable epoxy resin composition with a stoichiometric amount being most preferred.

Various conventionally employed additives can be admixed with these polyepoxide-containing compositions prior to final cure. For example, in certain instances it may be desired to add minor amounts of other co-catalysts, or hardeners, along with the curing agent system herein described. Conventional pigments, dyes, fillers, flame retarding agents and other compatible natural and synthetic resins can also be added. Furthermore, known solvents for the polyepoxide materials such as acetone, methyl ethyl ketone, toluene, benzene, xylene, dioxane, methyl isobutyl ketone, dimethylformamide, ethylene glycol monoethyl ether acetate, and the like, can be used if desired, or where necessary.

THE AMINE CURING AGENT

A curable epoxy resin composition is prepared by admixing one or more epoxides, as described above, with an epoxy-interactive polyamine curing agent. The ratio of active amino hydrogens to epoxy groups in the admixture may suitably be in the range of about 0.5–2:1 and, preferably, in the range of about 0.8–1.2:1.

Suitable polyamine curing agents are those that contain more than two active hydrogens per molecule. Examples of such curing agents are alkylene polyamines represented by the formula:

$$NH_2C_2H_4(NHC_2H_4)_nX$$

where X is —OH or —NH$_2$ and where n has the value of 0 to about 5. When X is —NH$_2$, such alkylene polyamines include ethylene diamine, diethylene triamine, triethylene tetramine, tetraethylene pentamine, pentaethylene hexamine, and the like.

These polyamines provide admixtures having low viscosity and provide epoxy resin compositions that generally have good chemical resistance.

When X is —OH, representative amines include $$H_2NC_2H_4NHC_2H_4NHCH_2CH_2OH,$$

$$H_2NCH_2CH_2NHC_2H_4NHC_2H_4NHC_2H_4NHCH_2CH_2OH$$

Long-chain polyamine adducts such as, for example, trimethyl-1,6-hexanediamine may also be used to impart color stability.

Thus, broadly speaking, aromatic, alicyclic, heterocyclic, and aliphatic amines may be used as well as more complex amine compounds such as polyether polyamines, etc. Other examples include N-aminoethylpiperazine, m-phenylenediamine, 2,4- or 2,6-toluenediamine, etc.

Another class of amines are amines derived from polyoxypropylene diols and triols.

Thus, we employ polyoxypropylene diamines of the formula:

$$NH_2HC(CH_3)CH_2-OCH_2CH(CH_3)]_xNH_2$$

wherein x is an integer of from about 2 to about 40. The most preferred polyoxypropylene diamines of the formula have average molecular weights between about 230, where x is an average of 2.6 to about 2,000 where x is an average of about 33.1. We may also use polyoxypropylene triamines of the formula:

$$\begin{array}{l}CH_2\!\!+\!\!OCH_2CH(CH_3)\!\!+_x\!\!NH_2\\|\\CH_3CH_2CCH_2\!\!+\!\!OCH_2CH(CH_3)\!\!+_y\!\!NH_2\\|\\CH_2\!\!+\!\!OCH_2CH(CH_3)\!\!+_z\!\!NH_2\end{array}$$

wherein x, y and z represent integers in the range of about 1 to 15, and the sum of x, y and z is from about 3 to about 50. Preferred polyoxypropylene triamines of the above formula have average molecular weights between about 190 to about 3,000. These polyoxypropylene di- and triamines are readily available commercially in a wide variety of molecular weight ranges.

Also useful are amines having the formula:

$$H_2NCH(CH_3)CH_2[OCH(CH_3)CH_2]_x\text{—}[OCH_2CH_2]_y\text{—}[OCH_2CH(CH_3)]_zNH_2$$

where x+z equals 2 to 10 and y is a number having a value from 1 to 50.

Although not essential for the practice of this invention, the use of commonly known additives which enhance the color or properties of the epoxy resin may be used as desired. For example, chipped or milled glass fibers, chopped or milled carbon fibers and/or other mineral fibers are useful.

PREPARATION OF THE EXTENDED AMINE CURING AGENT

In accordance with the present invention, a polyethylene terephthalate is comminuted and then dissolved in an amine curing agent of the type described herein. This is a straight-forward operation that can be performed in any suitable reaction vessel such as an autoclave provided with agitation means and means for heating the contents of the clave. The desired quantity of the amine curing agent is placed in the vessel and brought to a desired temperature with agitation normally within the range of about 100° to 250° C., preferably under an inert atmosphere. The temperature to be utilized will be, in part, a function of the temperature at which the polyethylene terephthalate will dissolve. It has been found that this normally will occur at a temperature within the range of about 150 to about 240.

In some situations the resultant solution may tend to separate into two or more layers. This does not present a problem so long as the layers are well mixed before the extended amine is added to the epoxy, as hereinafter described.

Under these conditions, the polyethylene terephthalate will be "digested", which is to say, it will become at least partially degraded by the action of the amine so that the resultant composition is more accurately characterized as a solution of an at least partially degraded normally solid polyethylene terephthalate in an amine curing agent.

SPECIFIC EXAMPLES

Example 1

A series of extended amine curing agents was prepared by dissolving scrap polyethylene terephthalate in the desired amine in a reaction kettle at an appropriate temperature with agitation and heating.

The polyethylene terephthalate used in this series of experiments was the type used to produce soft drink bottles.

The amines that were used, the temperature of the solution and the amount of scrap polyethylene terephthalate (PET) incorporated are indicated in the following table.

TABLE 1

Amine.PET Solutions Prepared

| Run # | Amine | Amount Scrap PET added, wt % | Temp. required, °C. | Remarks |
|---|---|---|---|---|
| 5409-70 | JEFFAMINE D-230 | 20 | 230 | — |
| 5409-87 | JEFFAMINE D-230 | 30 | 230 | Very high viscosity |
| 5465-19 | JEFFAMINE T-403 | 20 | 235 | — |
| 5465-21 | JEFFAMINE D-400 | 20 | 235 | — |
| 5465-36 | N—aminoethylpiperazine | 20 | 200 | solidfied |
| 5465-40 | Isophoronediamine | 20 | 200 | — |
| 5465-74 | N—aminoethylpiperazine (abbreviated herein as AEP) | 5 | 190 | White precipitate |
| 5465-98 | Isophoronediamine | 5 | 200 | — |
| 5516-17 | JEFFAMINE D-230 | 5 | 220 | — |
| 5516-19 | Triethylenetetramine | 5 | 160 | — |

JEFFAMINE D-230 and D-400 are represented by the following structure:

$$H_2NCH(CH_3)CH_2\text{—}[OCH_2CH(CH_3)]_x NH_2$$

| JEFFAMINE | x (approx.) |
|---|---|
| 400 | 5.6 |
| 230 | 2.6 |

JEFFAMINE T-403 has the following structure:

$$\begin{array}{l} CH_2[OCH_2CH(CH_3)]_xNH_2 \\ | \\ CH_3CH_2CCH_2[OCH_2CH(CH_3)]_yNH_2 \\ | \\ CH_2[OCH_2CH(CH_3)]_zNH_2 \\ x + y + z = 5.3 \end{array}$$

Representative solutions from Table 1 were subjected to infrared analysis and GPC analysis. The results of the analyses are reported in Table 2.

TABLE 2

Analyses of Amine PET Solutions

| Run No. | Amine | % PET | IR Analysis | GPC Analysis |
|---|---|---|---|---|
| 5465-19 | T-403 | 20 | Moderate-strong bands indicating secondary amide. Small-moderate C=O band of an ester. | Single broad peak. |
| 5465-21 | D-400 | 20 | Moderate-strong bands indicating secondary amide. Small-moderate C=O band of an ester. | Single broad peak. |
| 5465-40 | IPDA | 20 | Predominant structural group is a secondary amide. Very small amount of ester present. | Broad peak indicating range of molecular weight material higher than IPDA. IPDA peak much shorter than in unmodified sample. |
| 5455-98 | IPDA | 5 | Bands indicate some ester and a moderate amount of secondary amide. | Broad peak above IPDA peak indicating wide molecular weight range of degraded polymer. |
| 5455-36 | AEP | 20 | Strong bands typical | — |

TABLE 2-continued

| Run No. | Amine | % PET | IR Analysis | GPC Analysis |
|---|---|---|---|---|
| 5455-74 | AEP | 5 | of secondary amides. Bands indicate amide. C=O band of PET is not seen. | Single peak above AEP peaks. |
| 5446-19 | TETA | 5 | — | Very broad peak indicating severely degraded high molecular weight material. |

As will be seen from Table 2, the infrared analyses of the samples show the presence of secondary amide groups, carbonyl bands, and in some instances, complete degradation or digestion of the polyethylene terephthalate. Thus, in run 5465-74, the carbonyl bands of polyethylene terephthalate were not detected, indicating that the digestion or degradation was complete. The presence of amide groups in all of the samples indicates that at least some degradation had taken place and, in the case of runs 5465-40 and 5465-98, only a small to moderate amount of degraded polyester remained after the digestion.

The GPC analysis confirms the foregoing observations.

The physical properties of the resultant solutions were measured and the results as set forth in Table 3.

TABLE 3

Typical Analytical Analyses of Amine.PET Solutions

| Run No. | 5409-68A | 5516-17 | 5409-68C | 5465-19 | 5465-21 | 5465-28C | 5465-40 | 5465-98 | 5465-18 | 5465-36 | 5465-74 | 5465-28A | 5516-19 |
|---|---|---|---|---|---|---|---|---|---|---|---|---|---|
| Amine | D-230 | D-230 | T-403 | T-403 | D-400 | D-400 | IPDA | IPDA | IPDA | AEP | AEP | AEPA | TETA | TETA |
| Wt % PET | 0 | 5 | 0 | 20 | 0 | 20 | 0 | 20 | 5 | 0 | 20 | 5 | 0 | 5 |
| Total acetylatables, meq/g | 8.75 | 8.44 | 6.75 | 4.70 | 5.17 | 3.51 | 11.74 | 9.06 | 11.24 | 15.68 | 11.96 | 15.0 | 23.70 | 22.9 |
| Total amine, meq/g | 8.45 | 7.72 | 6.45 | 3.58 | 4.99 | 2.39 | 11.89 | 7.72 | 10.68 | 23.50 | 16.02 | 21.3 | 24.44 | 23.7 |
| 1° Amine, meq/g | 8.30 | 7.53 | 6.16 | 2.99 | 4.93 | 2.23 | 11.87 | 7.64 | 10.66 | 7.5 | 3.71 | 14.15 | 11.32 | 10.3 |
| 2° Amine, meq/g | — | — | — | — | — | — | 0.01 | 0.05 | 0.01 | 7.03 | 6.19 | — | 10.66 | 10.7 |
| 3° Amine, meq/g | — | — | — | — | — | — | 0.016 | 0.03 | 0.01 | 8.97 | 6.12 | 7.23 | 2.46 | 2.7 |
| Specific gravity, 20/20° C. | 0.9480 | 0.9705 | 0.9812 | 1.0745 | 0.9702 | 1.0625 | 0.9261 | 1.0217 | 0.9488 | 0.9879 | — | 1.0077 | 0.9853 | 1.0034 |
| Water, wt % | 0.10 | 0.08 | 0.08 | 0.04 | 0.13 | 0.09 | 0.17 | 0.23 | 0.05 | 0.57 | 0.67 | 0.24 | 1.78 | 0.24 |

Example 2

In another series of tests, a number of the extended epoxy amine curing agents and controls were mixed with an epoxy resin and the pot lives of the resultant mixtures were measured. The epoxy resin that was used was a liquid epoxy resin with an equivalent weight of about 188. The results of this series of tests is set forth in Table 4.

TABLE 4

Pot Life of Epoxy Resin Mixed with Amine.PET Solutions

| Curative | Curative conc., phr | Gel time, min, (100 g mass) | Peak exothermic temp. temp., °C. |
|---|---|---|---|
| JEFFAMINE D-230 | 26.4 with 5 phr Acc. 399* | 52.0[1] | 189.5 |
| D-230.PET (80/20) | 37.6 with 5 phr Acc. 399* | 36.7[1] | 122.5 |
| D-230.pet (95/5) | 26 with 5 phr Acc. 399* | 47.5[1] | 153.3 |
| JEFFAMINE T-403 | 36.4 with 5 phr Acc. 399* | 27.6[2] | 94.3 |
| T-403.PET (80/20) | 49.6 with 5 phr Acc. 399* | 28.4[2] | 65.8 |
| N—aminoethylpiperazine (AEP) | 23 | 17.8 | 171.1 |
| AEP.PET (80/20) | 24 | 13.4 | 131.5 |
| Isophoronediamine (IPDA) | 39 with 5 phr Acc. 399* | 36.5 | 129.6 |
| IPDA.PET (80/20) | 45.3 with 5 phr Acc. 399* | 7.1 | 141.6 |
| IPDA.PET (95/5) | 40 with 5 phr Acc. 399* | 15.3[1] | 216.4 |
| Triethylenetetramine (TETA) | 12 | 31.7 | 123.3 |
| TETA.PET (95/5) | 15 | 18.8 | 177.2 |

*Accellerator 399 is described in U.S. Pat. No. 4,195,153 and is a mixture of primary, secondary and tertiary amines having an amine equivalent weight of 65.
[1]200 g mass
[2]Test run at 50° C.

Results of pot life determinations indicate that more reactive curatives than the amines themselves have been prepared and that some accelerating species was formed during the heating process. As can be seen in Table 4, the greatest decrease in gel time involved the use of a 20 wt% solution of PET in isophoronediamine. This system was so reactive and so viscous that it could not be molded. Thus, no performance data are available.

Example 3

A series of epoxy resin molding compositions containing solutions of PET resin in Jeffamine polyetheramines were prepared and cured. The compositions prepared and the results obtained are set forth in Table 5.

TABLE 5

Properties of Epoxy Resin Cured with Solutions of PET in JEFFAMINE Polyetheramines (Elevated Temperature Cure)

| | 5409-68A | 5409-70A | 5516-17A | 5409-68C | 5465-19A |
|---|---|---|---|---|---|
| Formulation, pbw: | | | | | |
| Epoxy resin (WPE 188) | 100 | 100 | 100 | 100 | 100 |
| JEFFAMINE D-230 | 32 | — | — | — | — |
| D-230.PET (80/20) | — | 44 | — | — | — |
| D-230.PET (95/5) | — | — | 32 | — | — |
| JEFFAMINE T-403 | — | — | — | 42 | — |
| T-403.PET (80/20) | — | — | — | — | 58 |
| Properties of cured ⅛" Castings[1] | | | | | |
| Shore D hardness, 0–10 sec | 88–86 | 78–76 | 79–77 | 83–82 | 77–75 |
| Ultimate elongation, % | 6.6 | 3.2 | 6.5 | 10.2 | 2.0 |
| Heat deflection temp., °C. 264 psi load/66 psi load | 80/83.5 | 52/55 | 66/68 | 78/82.5 | 45/46 |
| Izod impact strength, ft-lb/in | 0.92 | 0.38 | 0.13 | 0.68 | 0.45 |
| Tensile strength, psi | 9100 | 10200 | 10000 | 8800 | 8000 |
| Tensile Modulus, psi | 427000 | 488000 | 418000 | 395000 | 426000 |
| Flexural strength, psi | 15000 | 17100 | 16500 | 14000 | 15000 |
| Flexural modulus, psi | 424000 | 516000 | 463000 | 402000 | 487000 |

[1]Cured 2 hrs at 80° C. and then for 3 hrs at 125° C.

TABLE 6

Properties of Epoxy Resin Cured with Solutions of Polyethylene Terephthalate in Various Amines (Elevated Temperature Curing)

| | 5417-18A | 5465-36 | 5409-49A | 5465-40 | 5465-98 | 5409-48A | 5516-19 |
|---|---|---|---|---|---|---|---|
| Formulation, pbw | | | | | | | |
| Epoxy Resin (WPE 188) | 100 | 100 | 100 | 100 | 100 | 100 | 100 |
| N—aminoethylpiperazine (AEP) | 23 | — | — | — | — | — | — |
| AEP.PET (80/20) | — | 24 | — | — | — | — | — |
| Isophoronediamine (IPDA) | — | — | 45 | — | — | — | — |
| IPDA.PET (80/20) | — | — | — | 53 | — | — | — |
| IPDA.PET (95/5) | — | — | — | — | 47 | — | — |
| Triethylenetetramine (TETA) | — | — | — | — | — | 12 | — |
| TETA.PET (95/5) | — | — | — | — | — | — | 15 |
| Glass transition temp., °C. | | 82 | 93 | 119 | 121 | 105 | 130 |
| Properties of cured ⅛" Castings[1] | | | | | | | |
| Shore D hardness, 0–10 sec | 89–87 | 80–79 | 76–74 | [2] | 74–73 | 83–81 | 82–80 |
| Ultimate elongation, % | 13.6 | 2.3 | 3.2 | | 4.0 | 3.6 | 4.3 |
| Heat deflection temp., °C. | | | | | | | |
| 264 psi load/66 psi load | 104/110 | 95/103 | 84/90 | | 84/89 | 101/110.5 | 105/122 |
| Izod impact strength, ft-lb/in | 1.25 | 0.35 | 0.52 | | 0.24 | 0.40 | 0.17 |
| Tensile strength, psi | 10000 | 7500 | 9200 | | 8300 | 10200 | 9700 |
| Tensile modulus, psi | 351000 | 383000 | 439000 | | 419000 | 407000 | 382000 |
| Flexural strength, psi | 15000 | 15000 | 17000 | | 17600 | 17000 | 15500 |
| Flexural modulus, psi | 359000 | 419000 | 442000 | | 448000 | 416000 | 408000 |

[1]Cured 2 hrs 80° C., 3 hrs 125° C.
[2]System too reactive to mold

Test results for the systems given in Tables 5 and 6 show that using solutions with high PET concentrations results in much shorter cure times but softer cured systems with lower impact strength and HDT values. Solutions with lower PET concentrations still give acceleration but the cured systems have higher impact strength and HDT values. Thus, properties of the system cured with a 5 wt% solution of PET in D-230 were similar to those of the D-230-cured system. The IPDA.-PET (95/5)-cured system had a much shorter pot life than one cured with IPDA alone, but cured epoxy properties were nearly the same for the two systems.

Example 4

In parallel tests, about 10 g of PET chips and about 50 g of an amine were placed in a closed container and allowed to stand for one week under ambient conditions. D-230 was used in one of the tests and diethylenetriamine (DETA) in the other. Thereafter, samples of each amine were subjected to IR analysis. In the case of D-230 the IR spectrum indicated that there was no reaction with the PET. In the case of DETA, the IR spectrum indicated that a detectable but minimal amount of amide formation had occurred as a result of minimal reaction of the PET with the DETA.

As will be seen by the foregoing specific examples, the extended amine curing agents of the present invention provide cured epoxy systems that are suitable for industrial applications.

It will be understood that the foregoing examples are given by way of illustration only and not by way of limitation and that the scope of the present invention is defined solely by the appended claims.

What is claimed is:

1. A composition for use in the curing of a 1,2-epoxy resin consisting essentially of a solution of an at least partially degraded normally solid secondary amide-containing polyethylene terephthalate in an amine curing agent.

2. A composition as in claim 1 wherein the amine has the formula:

$$H_2NC_2H_4(HNC_2H_4)_nX$$

wherein n is a number having a value of 0 to 4 and X is —OH or —NH$_2$.

3. A composition as in claim 1 wherein the amine as the formula:

$$NH_2CH(CH_3)CH_2[OCH_2CH(CH_3)]_xNH_2$$

wherein x is a number having a value of about 2 to 40.

4. A composition as in claim 3 wherein x has a value of about 2.6.

5. A composition as in claim 3 wherein x has a value of about 5.6.

6. A composition as in claim 1 wherein the amine has the formula:

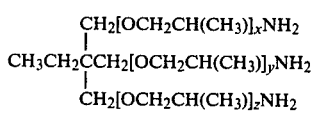

wherein x, y and z represent numbers in the range of about 1 to 15 and the sum of x, y and z is from about 3 to 50.

7. A composition as in claim 6 wherein the sum of x plus y plus z equals about 5.3.

8. A composition as in claim 1 wherein the amine is N-aminoethylpiperazine.

9. A composition as in claim 1 wherein the amine is isophoronediamine.

10. A composition as in claim 1 wherein the amine is triethylenetetramine.

11. A method for the preparation of a composition useful in the curing of a 1,2-epoxy resin which comprises the steps of:
a. heating a liquid amine curing agent at a temperature of 150 to about 240 degrees C., and
b. maintaining said amine at said temperature while dissolving therein a normally solid polyethylene terephthalate, to thereby provide a solution of an at least partially degraded secondary amide-containing polyethylene terephthalate.

12. A method as in claim 11 wherein the amine is an amine having the formula:

wherein n is a number having a value of about 0 to 5 and x is hydroxyl or amino.

13. A method as in claim 11 wherein the amine is an amine having the formula:

wherein x is a number having a value of about 2 to 40.

14. A method as in claim 11 wherein the amine is an amine having the formula:

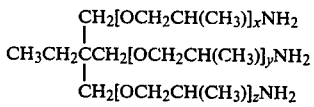

wherein x, y and z represent numbers in the range of about 1–15 and wherein x+y+z equals about 3 to 50.

15. A method as in claim 11 wherein the amine is N-aminoethylpiperazine or isophoronediamine.

16. A method for curing a 1,2-epoxy resin which comprises intimately mixing said epoxy resin with an effective amount of an amine curing agent consisting essentially of a solution of an at least partially degraded normally solid secondary amide-containing polyethylene terephthalate in an amine curing agent, whereby reaction of amino hydrogens of said amine with epoxy groups in said epoxy resin composition will result in the curing of said epoxy resin.

17. A method as in claim 16 wherein the amine has the formula:

wherein n is a number having a value of 0 to 5.

18. A method as in claim 17 wherein n has a value of 2.

19. A method as in claim 16 wherein the amine has the formula:

wherein x is a number having a value of about 2 to 40.

20. A method as in claim 19 wherein n has a value of about 2.6.

21. A method as in claim 19 wherein n has a value of about 5.6.

22. A method as in claim 16 wherein the amine is an amine having the formula:

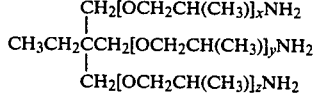

wherein x, y and z represent numbers in the range of about 1 to 15 and x+y+z equals about 3 to 50.

23. A method as in claim 22 where x+y+z=about 5.3.

24. A method as in claim 16 wherein the amine is N-aminoethylpiperazine.

25. A method as in claim 16 wherein the amine is isophoronediamine.

26. A 1,2-epoxide resin composition prepared by curing a 1,2-epoxy resin with an amine curing agent consisting essentially of an amine having dissolved therein an at least partially degraded normally solid secondary amide-containing polyethylene terephthalate.

27. A composition as in claim 26 wherein the amine has the formula:

where n is a number having a value of 0 to 4.

28. A composition as in claim 27 wherein n has a value of about 2.

29. A composition as in claim 26 wherein the amine has the formula:

wherein n is a number having a value of 2 to 40.

30. A composition as in claim 29 wherein n has a value of about 2.6.

31. A composition as in claim 29 wherein n has a value of about 5.6.

32. A composition as in claim 26 wherein the amine is an amine having the formula:

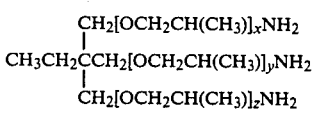

wherein x, y and z are numbers in the range of about 1–15 and x+y+z is from about 3 to 50.

33. A composition as in claim 32 wherein x+y+z=about 5.3.

34. A composition as in claim 26 wherein the amine is N-aminoethylpiperazine.

35. A composition as in claim 26 wherein the amine is isophoronediamine.

36. A method for curing a 1,2-epoxide resin composition which comprises the steps of:
(a) heating an amine curing agent at a temperature of about 150° to about 240° C.,
(b) maintaining said amine at said temperature while adding thereto a normally solid polyethylene terephthalate for a period of time sufficient to form a solution of an at least partially degraded secondary amide-containing polyethylene terephthalate in said amine,
(c) to thereby provide a 1,2-epoxy resin curing composition consisting essentially of a solution of an at least partially degraded normally solid secondary amide-containing polyethylene terephthalate resin in said amine curing agent, and
(d) mixing a 1,2-epoxy resin with an effective amount of said 1,2-epoxy resin curing composition whereby reaction of amino hydrogens in said amine with epoxy groups in said epoxy resins will result in the curing of said epoxy resin.

37. An epoxide resin composition formed by curing a 1,2-epoxy resin with an epoxy resin curing composition consisting essentially of an amine curing agent having an at least partially degraded normally solid secondary amide-containing polyethylene terephthalate resin dissolved therein, said 1,2-epoxy resin curing composition having been prepared by heating said amine curing agent at a temperature of about 150° to about 240° C. and maintaining said amine at said temperature, adding a normally solid polyethylene terephthalate resin to said heated amine, and maintaining said amine at said temperature for a period of time sufficient to form a solution of an at least partially degraded normally solid secondary amide-containing polyethylene terephthalate resin in said amine.

* * * * *